United States Patent [19]

Smith et al.

[11] 4,261,871

[45] Apr. 14, 1981

[54] LOW ENERGY-CURABLE HIGH SOLIDS COATINGS

[75] Inventors: Oliver W. Smith, South Charleston; Joseph V. Koleske, Charleston, both of W. Va.

[73] Assignee: Union Carbide Corporation, New York, N.Y.

[21] Appl. No.: 103,209

[22] Filed: Dec. 13, 1979

[51] Int. Cl.³ ................ C08G 63/08; C08G 63/76; C08G 59/62
[52] U.S. Cl. ............................ 260/18 EP; 525/411; 528/92; 528/110; 528/115; 528/357; 528/361; 260/18 PF
[58] Field of Search .............. 525/411; 528/110, 92, 528/115, 357, 361; 260/18 EP, 18 PF

[56] References Cited

U.S. PATENT DOCUMENTS

| | | | |
|---|---|---|---|
| 3,896,303 | 7/1975 | Gerkin et al. | 260/78.3 R |
| 4,086,293 | 4/1978 | Smith et al. | 260/830 R |
| 4,086,294 | 4/1978 | Koleske et al. | 260/834 |
| 4,119,593 | 10/1978 | Smith et al. | 260/18 EP |

*Primary Examiner*—Earl A. Nielsen
*Attorney, Agent, or Firm*—Stanley Ktorides

[57] ABSTRACT

High solids, low energy curing compositions of (1) a carboxyl-modified polycaprolactone polyol which is the reaction product of a polycaprolactone polyol and an intramolecular carboxylic acid anhydride, (2) a monocarboxylic acid compound, (3) a stannous salt and (4) a polyepoxide. The compositions are useful as inks or coatings.

30 Claims, No Drawings

LOW ENERGY-CURABLE HIGH SOLIDS COATINGS

BACKGROUND OF THE INVENTION

Government regulations have placed ever increasing restrictions on the amounts and types of organic volatiles permitted to escape into the atmosphere from coatings compositions. Considerable efforts have been expended to develop coatings compositions having a minimal amount of volatile organic components; and this had led to development of powder coatings, radiation-curable coatings, water-borne coatings, and high solid coatings. In these recent developments, the amounts of organic solvents present are minimal; consequently, there is little or no atmospheric pollution.

In the field of solvent coatings, efforts have been made to reduce the amount of volatile solvent present and to increase the amount of reactive components that will react to produce the coatings on the substrate. At a sufficiently high concentration of such components, one has what is known as a high solids coating composition. These are compositions that are applied in liquid form and dry to acceptable films without the evaporation of substantial quantities of solvents. Such compositions are described, for example, in U.S. Pat. No. 4,086,293 and in U.S. Pat. No. 4,119,593. U.S. Pat. No. 4,086,293 describes compositions of a polyepoxide, a stannous salt and a carboxyl-modified polycaprolactone polyol which is the reaction product of polycaprolactone polyol with an intramolecular carboxylic acid anhydride; U.S. Pat. No. 4,119,593 describes compositions of a polyepoxide, a stannous salt and a monocarboxylic acid compound.

The major factors which have led to the development of high solids coatings, i.e. the deleterious effects of organic solvent in the atmosphere and the high cost of energy needed to drive off the solvent, have become even more pronounced. Consequently there is a continuing need for high solids compositions which require less energy to cure and result in less air pollution than heretofore known high solids compositions. One way of accomplishing these ends is to increase the amount of solids content in the compositions. Therefore a high solids composition having a higher solids content than the composition heretofore available, which is easily applicable to a substrate and which cures to a good satisfactory dry film would be of great importance.

SUMMARY OF THE INVENTION

It has now been found that the combination of a polyepoxide, a stannous salt, certain monocarboxylic acid compounds and a carboxyl-modified polycaprolactone polyol which is the reaction product of a polycaprolactone polyol with an intramolecular carboxylic acid anhydride, all as hereinafter more fully described will produce high solids compositions having a higher solids contents than heretofore known high solids compositions and cure rapidly and efficiently with the use of less energy.

DESCRIPTION OF THE INVENTION

The carboxyl-modified polycaprolactone polyol adducts that are blended with the polyepoxides, the stannous salts and the monofunctional carboxylic acids to produce the compositions of this invention are the adducts comprising the reaction product mixture of a polycaprolactone polyol and an intramolecular anhydride of a polycarboxylic acid. As starting materials for producing the adducts one can use any of the known polycaprolactone polyols that are commercially available and that are fully described, for example, in U.S. Pat. No. 3,169,945. As described in this patent the polycaprolactone polyols are produced by the catalytic polymerization of a excess of a caprolactone and an organic polyfunctional initiator having at least two reactive hydrogen atoms. The polyols for use herein can be single compounds or mixtures of compounds and either can be used. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycol, and similar polyalkylene glycols, either blocked, capped or heteric, containing up to about 40 or more alkyleneoxy units in the molecule, 3-methyl-1,5-pentanediol, cyclohexanediol, 4,4'-methylene-bis-cyclohexanol, 4,4'-isopropylidene-bis-cyclohexanol, xylenediol, 2-(4-hydroxymethylphenyl)ethanol, 1,4-butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

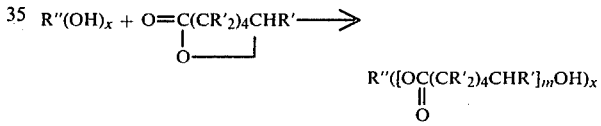

In this equation the organic functional initiator is the $R''(OH)_x$ compound and the caprolactone is the

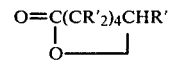

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to about 1,000. The most preferred are the polycaprolactone compounds having an average molecular of from about 375 to about 500 since they yield derivatives which impart good flexibility and hardness to the coating compositions of this invention. In the formula m is an integer representing the average number of repeating units needed to produce the compound having said molecular weights. The hydroxyl number of the polycaprolactone polyol can be from 15 to 600, preferably from 220 to 500; and the polycaprolactone polyol can have from 2 to 6, preferably 2 to 4 hydroxyl groups.

Illustrative of polycaprolactone polyols that can be used as starting materials in the production of the polycaprolactone derivatives used in the blend of this invention one can mention the reaction products of a polyhydroxyl compound having from 2 to 6 hydroxyl groups with caprolactone. The manner in which these polycaprolactone polyol compositions are produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the compound; this figure is shown in the third column.

POLYCAPROLACTONE POLYOLS

| Initiator | Average MW of polyol | Average No. of CPL Units in molecules |
| --- | --- | --- |
| 1 Ethylene glycol | 290 | 2 |
| 2 Ethylene glycol | 803 | 6.5 |
| 3 Ethylene glycol | 2,114 | 18 |
| 4 Propylene glycol | 874 | 7 |
| 5 Octylene glycol | 602 | 4 |
| 6 Decalene glycol | 801 | 5.5 |
| 7 Diethylene glycol | 527 | 3.7 |
| 8 Diethylene glycol | 847 | 6.5 |
| 9 Diethylene glycol | 1,246 | 10 |
| 10 Diethylene glycol | 1,998 | 16.6 |
| 11 Diethylene glycol | 3,526 | 30 |
| 12 Triethylene glycol | 754 | 5.3 |
| 13 Polyethylene glycol (MW 200)* | 713 | 4.5 |
| 14 Polyethylene glycol (MW 600)* | 1,396 | 7 |
| 15 Polyethylene glycol (MW 1500)* | 2,868 | 12 |
| 16 1,2-Propylene glycol | 646 | 5 |
| 17 1,3-Propylene glycol | 988 | 8 |
| 18 Dipropylene glycol | 476 | 3 |
| 19 Polypropylene glycol (MW 425)* | 824 | 3.6 |
| 20 Polypropylene glycol (MW 1000)* | 1,684 | 6 |
| 21 Polypropylene glycol (MW 2000)* | 2,456 | 4 |
| 22 Hexylene glycol | 916 | 7 |
| 23 2-Ethyl-1,3-hexanediol | 602 | 4 |
| 24 1,5-Pentanediol | 446 | 3 |
| 25 1,4-Cyclohexanediol | 629 | 4.5 |
| 26 1,3-Bis(hydroxyethyl)-benzene | 736 | 5 |
| 27 Glycerol | 548 | 4 |
| 28 1,2,6-Hexanetriol | 476 | 3 |
| 29 Trimethylolpropane | 590 | 4 |
| 30 Trimethylolpropane | 761 | 5.4 |
| 31 Trimethylolpropane | 1,103 | 8.5 |
| 32 Triethanolamine | 890 | 6.5 |
| 33 Erythritol | 920 | 7 |
| 34 Pentaerythritol | 1,219 | 9.5 |

*Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

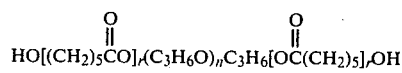

wherein the sum of r+r has an average value of 6 and the average molecular weight is 1,684. This explanation makes explicit the structural formulas of compounds 1 to 34 set forth above.

The polycaprolactone polyol is reacted with a polycarboxylic acid anhydride and illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

The amount of polycarboxylic acid anhydride reacted with the polycaprolactone polyol can be an amount sufficient to react with all of the hydroxyl groups present in the polycaprolactone polyol. This amount will vary and can be from 0.5 to 1 anhydride equivalent for each hydroxyl equivalent or group present in the polycaprolactone polyol initially charged to the reaction mixture. Preferably from 0.85 to 0.95 anhydride equivalent per hydroxyl equivalent is used, with the most preferred ratio being 0.9 anhydride equivalent per hydroxyl equivalent. It is preferred not to have any free anhydride present in the adduct reation mixture as it presents problems in the formulations of this invention due to its insolubility.

The polycaprolactone polyols are reacted with the polycarboxylic acid anhydride with or without a solvent present at a temperature of about 75° to 200° C., preferably about 100° to 140° C. The time required for reaction will vary depending upon the particular reactants charged and the batch size of the reaction mixture, facts which are well known to those skilled in the art. Generally it has been found that a reaction period of the laboratory of from 15 to 45 minutes at from about 125° to 175° C. is adequate to produce the initial water insoluble carboxyl modified oligomer addition reaction product mixture obtained by the reaction of these two intermediates.

The adduct formed at this stage of the reaction is a viscous liquid in most instances. However, in some instances it has been observed that the product will solidify upon standing at room temperature for an extended period of time. This, however, does not detract from its further utility. Generally these modified oligomers or adducts are solvent soluble.

One can also modify the reaction by inclusion and reaction of an organic polyisocyanate to react with a portion of the hydroxyl groups prior to reaction with the anhydride, as is shown in Example 3 hereinafter. In such instances any of the known polyisocyanates can be used such as tolylene diisocyanate, 3,5,5-trimethyl-1-isocyanato-3-isocyanatomethycyclohexane, 4,4-diphenylmethane diisocyanate, hexamethylene diisocyanate, dicyclohexyl-4,4'-methane diisocyanate, and polymethylene polyphenolisocyanates, and the like.

In a typical reaction, one normally charges a polycaprolactone polyol and a polycarboxylic acid anhydride to a reaction vessel and heats the mixture to a temperature of from about 125° C. to 175° C. for a period of about 20 to 30 minutes. This produces the carboxyl modified polycaprolactone oligomer or adduct.

The monofunctional carboxylic acid compounds can be represented by the general formula $$HOOC-R-(COOR''')_x$$

wherein x is an integer having a value of from 0 to 2, preferably 0 or 1; when x is 0, R can be a phenyl group or an alkyl group having from 6 to 24 carbon atoms, preferably 12 to 18 carbon atoms; when x is 1, R can be a $-CH=CH-$ group; when x is 1 or 2, R can be a polyvalent alkylene having from 1 to 12 carbon atoms, preferably 2 to 6 carbon atoms, or a polyvalent phenylene group, or a polyvalent naphthylene group; R''' is an alkyl group having from 1 to 8 carbon atoms, preferably 1 to 3 carbon atoms, $-C_nH_{2n}(OC_nH_{2n})_mOC_{2p+1}$ group or a $-C_nH_{2n}OOCCX=CH_2$ group; n is 2 to 4, preferably 2, m is 0 to 10, preferably 2 to 7; p is 1 to 15 and X is hydrogen or methyl. The monofunctional carboxylic acid compounds can be unsubstituted or they can be substituted with any group which will not interfere with the reaction or have an undesirable effect on the finished coating. Illustrative of suitable substituents are the halogens, nitro, alkoxy, alkyl, keto and the like.

The most preferred monofunctional carboxylic acid compounds are those having a $pK_a$ value of less than 4. In addition, those that are liquid and readily miscible are more preferred than are the solid compounds which may present problems of uniform distribution in the composition.

Illustrative of the monofunctional carboxylic acid compounds when x is 0 one can name hexanoic acid, octanoic acid, caprylic acid, capric acid, hendacanoic acid, lauric acid, tridecanoic acid, pentadecanoic, stearic acid, arachidic acid, behenic acid, cerotic acid, 2-ethylhexanoic acid, 9-methyldecanoic acid, benzoic acid, naphthoic acid, myristic acid, palmitic acid, palmitoleic acid, oleic acid, linoleic acid, linolenic acid, olestearic acid, licanic acid, ricinoleic acid, hexenoic acid, hexadienoic acid, and the like. It is advantageous for purposes of economy to employ mixtures of acids, particularly those derived from natural sources such as linseed oil, castor oil, dehydrated castor oil, coconut oil, cotton seed oil, oiticaca oil, perilla oil, palm oil, olive oil, safflower oil, sardine oil, soybean oil, tung oil, tall oil, and the like.

When x is 1 or 2, the monufunctional carboxylic acid compounds are the partial esters (having a free carboxyl group) of di- or tri-carboxylic acids or the anhydrides thereof. These partial esters are known to those skilled in the art, as are the methods by which they are produced. Illustrative thereof are the partial esters of the following acids: oxalic, malonic, succinic, glutaric, adipic, suberic, azelaic, sebacic, brassylic, maleic, fumaric, itaconic, phthalic, isophthalic, terephthalic, trimellitic, tartaric, malic, 1,2-cyclohexanedicarboxylic 1,4-cyclohexanedicarboxylic, tetrahydrophthalic, tetrachlorophthalic, 1,4,5,6,7,7-hexachloro-5-norbornene-2,3-dicarboxylic acid, and the like.

The polyepoxides that can be used in producing the high solids compositions of this invention are well known to those skilled in the art and are fully described in U.S. Pat. No. 3,027,357, U.S. Pat. No. 2,890,194, U.S. Pat. No. 2,890,197, U.S. Pat. No. 3,117,009, U.S. Pat. No. 3,031,434, U.S. Pat. No. 3,125,592 and U.S. Pat. No. 3,201,360. Of particular interest is that portion of U.S. Pat. No. 3,027,357 beginning at column 4, line 11 to column 7, line 38 and that portion of U.S. Pat. No. 3,201,360 beginning at column 2 line 60 to column 4, line 43, which portions are specifically incorporated herein by reference. Among some of the specific illustrative polyepoxides disclosed therein one can mention, 3,4-epoxycyclohexylmethyl-3,4-epoxycyclohexane carboxylate, bis(3,4-epoxycyclohexylmethyl)adipate, vinyl cyclohexane dioxide, bis(2,3-epoxycyclopentyl)ether, epoxidized linseed oil, epoxidized soybean oil, methyl epoxy linseedate, butyl epoxy soyate, octyl epoxy linseedate, epoxidized polymers and copolymers of butadiene, polyglycidyl ethers of polyhydric phenols, and the like.

The stannous salts are either the stannous acylates or stannous alkoxides. These can be substituted with hydroxyl, halogen, keto or other groups which do not deleteriously affect the reaction.

The stannous acylates which are used as catalysts in this invention are the divalent tin salts of mono- and dicarboxylic acids which contain from 1 to 54 carbon atoms. These can be salts of the saturated acids such as acetic acid, 2-ethylhexanoic acid, octanoic acid, 2-ethylhexanoic acid, ethyl acid phthalate, and the like, or of the unsaturated acids such as oleic acid, linoleic acid, eleostearic acid, ricinoleic acid, and the like. Illustrative of suitable stannous acylates one can name stannous acetate, stannous propionate, stannous oxalate, stannous butyrate, stannous tartrate, stannous valerate, stannous octanoate, stannous octoate, stannous stearate and stannous oleate. The preferred catalysts are stannous acetate, stannous octoate, stannous stearate and stannous oleate.

The stannous alkoxides which are used as catalysts in this invention are the divalent tin salts of a saturated or unsaturated branched chain or straight chain alcohol containing from 1 to 18 carbon atoms, preferably 3 to 12 carbon atoms. Representative examples of suitable stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, the o-, m- and p-stannous cresoxides, and the like.

The concentration of the polycaprolactone adduct in the compositions of this invention can be from 20 to 60 weight percent, preferably from 25 to 40 weight percent based on the combined weight of said polycaprolactone adduct, monofunctional carboxylic acid compound, polyepoxide and stannous salt.

The concentration of monofunctional carboxylic acid compound in the compositions of this invention can be from 5 to 50 weight percent, preferably from 10 to 30 weight percent, based on the combined weight of polycaprolactone adduct, monofunctional carboxylic acid compound, polyepoxide and stannous salt.

The concentration of polyepoxide in the compositions of this invention can be from 30 to 90 weight percent, preferably from 40 to 70 weight percent based on the combined weight of polycaprolactone adduct, monofunctional carboxylic acid compound, polyepoxide and stannous salt.

The concentration of stannous salt catalyst in the compositions of this invention can be from 0.1 to 10 weight percent, preferably from 0.5 to 2 weight percent based on the combined weight of polycaprolactone adduct, monofunctional carboxylic acid compound, polyepoxide and stannous salt.

The high solids curable compositions can also contain a minor amount of solvent, to assist in viscosity control. In such instances any of the known organic solvents can be used that are conventionally used in the coating and ink fields.

In addition, other crosslinkers, such as urea-formaldehyde resins or melamine-formaldehyde resins, can also be present in small amounts. In such instances one can include a known catalyst for this crosslinking reaction.

Combinations containing ethyl acid phthalate and reaction products formed by the reaction of a polycaprolactone polyol and an intramolecular anhydride of a polycarboxylic acid were found to be particularly effective initiators for the polymerization of epoxidized oils and cycloaliphatic epoxides in the presence of the stannous salts. Coatings containing 70 to 90 percent solids by weight were typical. These coatings cured rapidly at temperatures of from 90° C. to 120° C. Combinations of epoxidized linseed oil, cycloaliphatic epoxides, ethyl acid phthalate, and stannous octanoate afforded coatings with a good balance of hardness, flexibility and solvent resistance. Combinations of an aromatic polyepoxide, the diglycidyl ether of bisphenol-A, ethyl acid phthalate, and stannous octanoate did not cure well at temperatures below 150° C. However, when used in combination with epoxidized linseed oil or cycloaliphatic epoxides, the glycidyl ether of bisphenol-A did afford coatings with low energy cure responses indicating the beneficial influence of the aliphatic-type epoxides.

When the monofunctional carboxylic acid compound is a phthalate half-acid, the initiation of epoxide homopolymerization occurs at 100° C. as opposed to 150° C. to 200° C. when the acid is absent. By utilizing this technique, coatings can now be designed which minimize pollution and conserve energy.

In the absence of any stannous salt catalyst in the high solids compositions of this invention, the pot-life of the composition can be as much as 10 hours or more. The presence of a catalyst tends to hasten the cure reaction, even at ambient temperature, and generally reduces the pot-life to up to about 5 hours. It was observed, however, that the presence of a tertiary amine in amount in excess of the equivalent amount of catalyst present for the reaction, served to extend the pot-life of the compositions of this invention; in some instances to as long as two days.

In view of the pot-lives of the compositions, it is preferred to prepare the desired blend of polycaprolactone derivative and polyepoxide of this invention as it is needed. This is a common and accepted procedure in commercial practice today when reactive components are involved. The blends are produced by any of the known and practiced mixing procedures used by the ink and coating compositions industry. These procedures require no further description herein to enable one skilled in the art to produce our novel compositions.

The high solids compositions of this invention can also contain colorants, pigments, dyes, fillers, fungicides, bactericides, flow control additives, antioxidants, UV-absorbing agents, or other additives conventionally added to coating and ink compositions, in their usual concentrations.

The coating compositions are applied to a substrate by the known conventional methods. They are cured by heating at a temperature of about 50° C. to 150° C., preferably from 55° C. to 95° C. for a period of time sufficient to obtain a dry film. Generally, this time will range from about 1 to 30 minutes, preferably from 10 to 20 minutes. The components present in a particular coating composition used will control the temperature and time that will be required to obtain an adequate cure and a good film coating.

The coatings compositions of this invention are high solids coatings compositions and they can contain as much as 100 weight percent solids therein. Generally the total solids content of the coatings compositions of this invention ranges from about 70 to 90 weight percent of the total weight of the composition.

The novel high solids coatings compositions of this invention which contain both the carboxyl-modified polycaprolactone polyol adduct and a monofunctional carboxylic acid compound in addition to a stannous salt and a polyepoxide have a higher solids content, and are cured to dry films at lower temperatures that the known high solids coatings in which only the carboxyl-modified polycaprolactone polyol adduct or only the monofunctional carboxylic acid compound is present. This result was unexpected and is highly advantageous from both an air pollution and an energy usage standpoint.

The coatings compositions were evaluated according to the following procedures:

*Solvent resistance* is a measure of the resistance of the cured film to attack by acetone and is reported in the number of rubs or cycles of acetone soaked material required to remove one half of a film from the test area. The test is performed by stroking the film back and forth with an acetone soaked cheesecloth until that amount of film coating is removed. The number of cycles required to remove this amount of coating is a measure of the coating solvent resistance.

*Reverse impact* measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorber by the film without rupturing is a measure of the films reverse-impact resistance.

*Pencil hardness* is a measure of film hardness. The adhesion and cohesive strength of the film also influences pencil hardness. Pencils of known lead hardness are shaped to a cylindrical point with a flat tip. The pencils are manually pushed into the coating surface at a 45° angle. Pencil hardness is recorded as the hardest pencil which does not cut the coating.

*Pencil hardness after water immersion*—Coated panels are immersed in a circulating, distilled water-bath for 16 hours at 52° C. The panels are then placed in a shallow pan filled with warm tap water and tested for the retention of pencil hardness while immersed. This test is a measure of water sensitivity.

*Crosshatch adhesion*—The coated substrate is cut with a series of parallel razor blades in a crosshatch pattern. Adhesion of the coating to the substrate is tested by firmly applying high tack tape and pulling the tape off with a quick pull. The percent coating remaining within the crosshatch pattern is recorded as the crosshatch adhesion.

*Pasteurization* is a test designed to measure the resistance of a film to a simulated pasteurization cycle. The coated substrate is immersed in deionized, distilled water maintained at 76.7° C. for 45 minutes. The coated substrate is quickly dried with a dry cloth or tissue and observed for blush or film whitening. Then the crosshatch test is used to measure the "wet" adhesion of the coating.

In this application the following definitions describe the particular compounds that are used in the examples: Silicone Surfactant I is

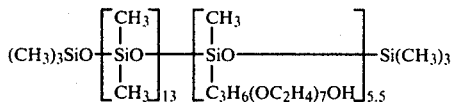

Polyol A is a polycaprolactone triol having an average molecular weight of 300 and an average hydroxyl number of 560. Polyol B is a polycaprolactone triol having an average molecular weight of 540 and an average hydroxyl number of 310. Polyol C is a polycaprolactone triol having an average molecular weight of 900 and an average hydroxyl number of 187.

Epoxide A is 3,4-epoxycyclohexylmethyl-3,4-epoxycyclohexane carboxylate.

Epoxide B is bis(3,4-epoxycyclohexylmethyl)adipate.

The following examples serve to further illustrate the invention.

EXAMPLE 1 (Ex.2-4, KTC-77-21)

A reaction flask equipped with a stirrer, thermometer, and nitrogen inlet tube was charged with 93.6 grams of 2-butoxyethanol and 21 grams of phthalic anhydride. The mixture was heated under nitrogen for 30 minutes at 130° C. The butoxyethyl monoester of phthalic acid produced was a light yellow liquid which crystallized upon standing at room temperature for about one week.

To a reaction flask similar to that described above there were charged 137.1 grams of Polyol A and 182.9 grams of phthalic anhydride. The mixture was reacted under nitrogen for 60 minutes at 135° C. in the presence of 80 grams of butyl acetate solvent. The resulting product was the carboxyl-modified polycaprolacetone polyol adduct; it as a clear, light brown liquid.

A coating composition was formulated by mixing 4 grams of the liquid butoxyethyl monester of phthalic acid and 7.5 grams of the above carboxyl-modified polycaprolactone polyol adduct with 18 grams of Epoxide B, 0.15 gram of stannous octoate, 0.13 gram of Silicone Surfactant I, and 3 grams of butyl acetate as solvent. Films were cast on steel panels with a number 40 wire-wound rod and cured for 30 minutes at 100° C. The cured film was solvent resistant (100 acetone rubs), flexible (>320 inch-pounds reverse impact), glossy and had a pencil hardness of H.

EXAMPLE 2 (Ex.5 KTC-77-21)

Following a procedure similar to that described in Example 1, a mixture of 81.4 grams of n-butanol and 98 grams of maleic anhydride was reacted for 10 minutes at 100° C. The produce was liquid butyl acid maleate and had a density of 1.097 gm/ml and an acid number of 334.3 mg KOH/gm.

A coating composition was formulated by mixing 1.45 grams of the above liquid butyl acid maleate and 5.2 grams of the carboxyl-modified polycaprolactone polyol adduct of Example 1 with 13.3 grams of Epoxide B, 0.2 gram of stannous octanoate, 0.1 gram of Silicone Surfactant I and 2 grams of butyl acetate. Films were cast as described in Example 1 and cured for 20 minutes at about 100° C. The cured film was flexible (>320 inch-pounds reverse impact) and glossy; it had a pencil hardness of F and passed 48 acetone rubs.

EXAMPLE 3 (Ex.6, KTC-77-21)

Following a procedure similar to that described in Example 1 a mixture of 600 grams of Polyol A, 600 grams of Polyol B and 1200 grams of phthalic anhydride was reacted for one hour at 135° C. After cooling to 90° C., 480 grams of butyl acetate solvent was added. The diluted carboxyl-modified polycaprolactone polyol adduct had an acid number of 161.6 mg KOH/gm.

A coating composition was formulated by mixing 10 grams of the above adduct and 2.4 grams of the butyl acid maleate of Example 2 with 10.7 grams of Epoxide A, 0.25 gram of stannous octanoate, 0.1 gram of Silicone Surfactant I, and 2 grams of butyl acetate. Films were prepared as described in Example 1 and cured for 30 minutes at 93° C. The cured film was glossy and solvent resistant (100 acetone rubs) had a pencil hardness of 3 H and a reverse impact resistance of 5 inch-pounds.

EXAMPLE 4 (Ex.7, 8, KTC-77-21)

There were charged to a four-liter resin reactor 900 grams of 200 proof ethanol and 2664 grams of phthalate anhydride. Following a procedure similar to that described in Example 1, the mixture was reacted for one hour at 140° C. to produce ethyl acid phthalate having an acid number of 284 mg KOH/gm and a density of 1.185 gm/cc.

Following a procedure similar to that described in Example 1, 258.4 grams of Polyol B and 141.6 grams of phthalic anhydride were reacted for 30 minutes at 140° C. to produce the carboxyl-modified polycaprolactone polyol adduct having a Brookfield viscosity of 3260 poises at 22° C. and an acid number of 127.2 mg KOH/gm.

A coating composition was formulated having an 87 weight percent solids content by mixing 5 grams of the above adduct and 5 grams of the above ethyl acid phthalate with 16.7 grams of Epoxide A, 0.27 grams of stannous octanoate, 0.1 grams of Silicone Surfactant I and 4 grams of butyl acetate. Films were cast as described in Example 1 and cured for 20 minutes at 93° C. The cured film was glossy, had a pencil hardness of 2 H, a reverse impact resistance of 5 inch-pounds and passed 85 acetone rubs.

EXAMPLE 5 (Ex.9.KTC-77-21)

A coating composition was formulated by mixing 1.25 grams of Aroflint 404 ® (a chlorinated polycarboxylic acid described in U.S. Pat. No. 3,218,274) and 2.25 grams of ethyl acid phthalate with 8.55 grams of Epoxide B, 0.11 gram of stannous octanoate, and 0.1 gram of Silicone Surfactant I. Films were cast as described in Example 1 and cured for 20 minutes at 93° C. and for 3 weeks at room temperature. The film cured at 93° C. had a high gloss, a pencil hardness of H, a reverse impact resistance of 275 inch-pounds and passed 52 acetone rubs. The film cured at room temperature had a high gloss, a pencil hardness of HB, a reverse impact resistance of 25 inch-pounds and passed 30 acetone rubs.

EXAMPLE 6 (Ex.10, KTC-77-21)

A 100-gallon, glass-lined autoclave equipped with a 15-inch, three blade impeller that operated at 114 rpm was charged with 180 pounds of 2-ethoxyethyl acetate solvent, 480 pounds of Polyol C, and 230 pounds of phthalic anhydride. The mixture was reacted for 4 hours at 140° C. to produce a liquid polycarboxylic adduct, which is the carboxyl-modified polycaprolactone triol adduct having a viscosity of 1240 centistrokes at 25° C. and an acid number of 102 mg KOH/gm.

A pigment-containing composition was prepared by charging 30 grams of the above polycarboxylic adduct, 30 grams of ethyl acid phthalate, 196 grams of titanium dioxide, 3 grams of stannous octanoate, and 46 grams of 2-ethoxyethyl acetate to a ball mill and grinding overnight.

A coating composition was formulated by blending 151.75 grams of the above pigment-containing composition with 60 grams of Epoxide A, 10 grams of Epoxide B and 0.75 gram of Silicone Surfactant I. The coating composition had an 88 weight percent solids content, a Brookfield viscosity of 270 centipoises at 25° C., and a Zahn cup viscosity of 40 seconds.

Films were applied to steel panels with a suction-feed spray gun and cured for 20 minutes at 105° C. The cured film was solvent resistant (100 acetone rubs) had a 20° C. gloss of 87, a pencil hardness of F, and a reverse impact resistance of 150 inch-pounds.

EXAMPLE 7 (Ex.12-17, KTC-77-21)

Following a procedure similar to that described in Example 1 a mixture of 750 grams of Polyol A, 750 grams of Polyol B, 1500 grams of phthalic anhydride and 750 grams of 2-ethoxyethyl acetate was charged to a 4-liter reactor and reacted for one hour at 140° C. The carboxyl-modified polycaprolactone polyol adduct had a solids content of 80 weight percent and a Brookfield viscosity of 87,300 centipoises at 25° C.

The above adduct was blended in 3 different proportions with ethyl acid phthalate and the acid number and viscosity were determined at 80 weight percent solids in 2-ethoxyethyl acetate. The mixtures and results are shown in Table I. For comparative purposes 2 compositions containing only the adduct and only the ethyl acid phthalate respectively were evaluated and the results are also shown in Table I.

TABLE I

|  | A | B | C | D | E |
|---|---|---|---|---|---|
| Adduct, (grams) | 100 | 75 | 50 | 25 | 0 |
| Ethyl acid phthalate, (gms) | 0 | 25 | 50 | 75 | 100 |
| 2-Ethoxyethyl acetate, (gms) | 25 | 25 | 25 | 25 | 25 |
| Brookfield viscosity, (poises) | 873 | 20.6 | 4.5 | 1.4 | 0.9 |
| Acid number, (mg KOH/gm) | 160 | 174 | 188 | 208 | 239 |

Five coating compositions were formulated by mixing 100 grams of the above compositions A–E with Epoxide A at a constant carboxyl-to-epoxide equivalent ratio of 0.3. The formulations are shown in Table II. Films were cast following a procedure similar to that described in Example 1 and cured for 30 minutes at 105° C. The films were evaluated and the results are shown in Table II.

TABLE II

|  | A | B | C | D | E |
|---|---|---|---|---|---|
| Epoxide A, (gms) | 129 | 140 | 151 | 167 | 190 |
| Stannous Octoate, (gms) | 2.3 | 2.4 | 2.4 | 2.7 | 2.9 |
| Silicone Surfactant I, (gms) | 1.2 | 1.2 | 1.2 | 1.3 | 1.4 |
| Weight Percent Solids | 91 | 92 | 92 | 93 | 93 |
| Viscosity at 25° C., (cps) | 1110 | 750 | 430 | 362 | 260 |
| Acetone Rubs | >100 | >100 | >100 | >100 | >100 |
| Pencil Hardness | 4H | 3H | 3H | 3H | 3H |
| Reverse Impact, (in-lbs) | <5 | <5 | <5 | <5 | <5 |

EXAMPLE 8 (EX.18, KTC-77-21)

Following a procedure similar to that described in Example 1, a mixture of 272 grams of Polyol C and 128 grams of phthalic anhydride was reacted for one hour at 140° C. The carboxyl-modified polycaprolactone polyol adduct had a Brookfield viscosity of 19,700 centipoises at 25° C. and an acid number of 120 mg KOH/gm.

A coating composition was formulated by blending 6.5 grams of the above adduct and 2.2 grams of linoleic acid with 11.3 grams of Epoxide A, 0.2 gram of stannous octanoate and 1 gram of 2-ethoxyethyl acetate. Films were cast as described in Example 1 at 95 weight percent solids and cured for 20 minutes at 105° C. The cured films were flexible (>320 inch-pounds reverse impact), solvent resistant (100 acetone rubs), and had pencil hardness of H.

What is claimed is:

1. A high solids liquid composition comprising (I) from 20 to 60 weight percent of a polycaprolactone adduct, (II) from 5 to 50 weight percent of monocarboxylic acid compound, (III) from 30 to 90 weight percent of a polyepoxide and (IV) from 0.1 to 10 weight percent of a stannous salt catalyst; said percentages based on the combined weight of (I), (II), (III), and (IV); wherein said component (I) comprises a carboxyl-modified polycaprolactone adduct reaction product mixture produced by the reaction of (i) a polycaprolactone polyol and (ii) from 0.5 to 1 carboxylic acid anhydride equivalent for each hydroxyl equivalent present in said polycaprolactone polyol of an intramolecular anhydride of a polycarboxylic acid; said component (II) is a compound of the general formula:

$$\text{HOOC}-\text{R}-(\text{COOR}''')_x$$

wherein x is an integer having a value of from 0 to 2;
when x is 0, R can be (i) a phenyl group, or (ii) an alkyl group having from 6 to 24 carbon atoms;
when x is 1, R can be a —CH=CH— group;
when x is 1 or 2, R can be (iii) a polyvalent alkylene group having from 1 to 12 carbon atoms, or (iv) a polyvalent phenylene group, or (v) a polyvalent naphthylene group;
R''' is
(i) an alkyl group having from 1 to 8 carbon atoms, or,
(ii) a —$C_nH_{2n}(OC_nH_{2n})_mOC_pH_{2p+1}$ group, or
(iii) a —$C_nH_{2n}OOCCX$=$CH_2$ group;
n is an integer having a value of 2 to 4;
m is an integer having a value of 0 to 10;
p is an integer having a value of 1 to 15; and
X is hydrogen or methyl;

and wherein component (IV) is a stannous acylate of a mono- or dicarboxylic acid having from 1 to 54 carbon atoms or a stannous alkoxide having from 1 to 18 carbon atoms in the alkoxide group.

2. A high solids composition as claimed in claim 1 wherein said polycaprolactone polyol in component (I) has from 2 to 6 hydroxyl groups.

3. A high solids composition as claimed in claim 1 wherein said polycaprolactone polyol in component (I) has from 2 to 4 hydroxyl groups.

4. A high solids compositions as claimed in claim 1 said polycaprolactone polyol in component (I) has an average molecular weight of from about 290 to about 3000.

5. A high solids composition as claimed in claim 1, wherein said polycaprolactone polyol in component (I) has an average molecular weight of from about 300 to about 1000.

6. A high solids composition as claimed in claim 1, wherein said polycaprolactone polyol in component (I) has an average molecular weight of from about 375 to about 500.

7. A high solids composition as claimed in claim 1, wherein said polycaprolactone polyol in component (I) is a mixture of polycaprolactone polyols.

8. A high solids composition as claimed in claim 1 wherein said intramolecular anhydride is phthalic anhydride.

9. A high solids composition as claimed in claim 1, wherein component (I) is present at a concentration of from 25 to 40 weight percent.

10. A high solids composition as claimed in claim 1, wherein component (II) is present at a concentration of from 10 to 30 weight percent.

11. A high solids composition as claimed in claim 1, wherein component (III) is present at a concentration of from 40 to 70 weight percent.

12. A high solids composition as claimed in claim 1, wherein component (IV) is present at a concentration of from 0.5 to 2 weight percent.

13. A high solids composition as claimed in claim 1, wherein in component (I) from 0.85 to 0.95 carboxylic acid anhydride equivalent is reacted per hydroxyl equivalent.

14. A high solids composition as claimed in claim 1, wherein component (II) has a pKa value of less than 4.

15. A high solids composition as claimed in claim 1, wherein component (II) is a monocarboxylic acid and x is 0.

16. A high solids composition as claimed in claim 1 wherein component (II) is a monocarboxyl partial ester of a polycarboxylic acid and x is 1 or 2.

17. A high solids composition as claimed in claim 1, wherein component (III) is a mixture of epoxides.

18. A high solids composition as claimed in claim 1, wherein a colorant is additionally present.

19. A high solids composition as claimed in claim 1, wherein component (IV) is stannous octanoate.

20. A high solids composition as claimed in claim 1, wherein component (II) is the butoxyethyl monoester of phthalic anhydride.

21. A high solids composition as claimed in claim 1, wherein component (II) is butyl acid maleate.

22. A high solids composition as claimed in claim 1, wherein component (II) is ethyl acid phthalate.

23. A high solids composition as claimed in claim 1, wherein component (II) is linoleic acid.

24. A high solids composition as claimed in claim 1, wherein in component (I) the compound (i) is a polycaprolactone triol having an average molecular weight of 300 and an average hydroxyl number of 560.

25. A high solids composition as claimed in claim 1, wherein in component (I) the compound (i) is a polycaprolactone triol having an average molecular weight of 540 and an average hydroxyl number of 310.

26. A high solids composition as claimed in claim 1, wherein in component (I) the compound (i) is a polycaprolactone triol having an average molecular weight of 900 and an average hydroxyl number of 187.

27. A high solids composition as claimed in claim 1, wherein in component (I) the compound (i) is a chlorinated polycarboxylic acid.

28. A high solids composition as claimed in claim 1, wherein component (III) is 3,4-epoxycyclohexyl-methyl-3,4-epoxycyclohexane carboxylate.

29. A high solids composition as claimed in claim 1, wherein component (III) is bis(3,4-epoxy-5-methylcyclohexylmethyl)adipate.

30. A composition as claimed in claim 1 in the form of a cured, dry film.

* * * * *